(12) United States Patent
Gureshnik et al.

(10) Patent No.: US 7,430,419 B2
(45) Date of Patent: Sep. 30, 2008

(54) RAPID DECODING OF CONTROL CHANNEL TO DECREASE HANDOFF TIME

(75) Inventors: Eran Gureshnik, Petah-Tikva (IL); Yona Leshets, Zur-Igal (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/933,833

(22) Filed: Sep. 3, 2004

(65) Prior Publication Data

US 2005/0159159 A1 Jul. 21, 2005

Related U.S. Application Data

(63) Continuation of application No. 09/753,085, filed on Dec. 28, 2000, now Pat. No. 6,792,272.

(51) Int. Cl.
*H04Q 7/20* (2006.01)
*H04Q 7/00* (2006.01)

(52) U.S. Cl. ............................... 455/436; 370/331

(58) Field of Classification Search .............. 455/436, 455/434, 438.1, 437, 407, 408, 418, 426.1, 455/439, 442, 444, 450, 166.2, 226.4, 67.13, 455/701, 216; 370/331, 332, 333; 450/436, 450/434, 436.1, 437, 407, 408, 418, 439, 450/442, 450, 166.2, 226.4, 67.13, 701, 216
See application file for complete search history.

(56) References Cited

U.S. PATENT DOCUMENTS

| | | | |
|---|---|---|---|
| 5,479,410 A | | 12/1995 | Paavonen |
| 5,822,313 A | * | 10/1998 | Malek et al. ................. 370/332 |
| 5,898,736 A | | 4/1999 | Saito et al. |
| 6,108,322 A | | 8/2000 | Kotzin et al. |
| 6,792,272 B2 | * | 9/2004 | Gureshnik et al. .......... 455/436 |
| 6,907,092 B1 | * | 6/2005 | Yakhnich et al. ............ 375/346 |
| 2001/0034233 A1 | | 10/2001 | Tiedemann et al. |

FOREIGN PATENT DOCUMENTS

| | | |
|---|---|---|
| JP | 05-218883 | 8/1993 |
| JP | 09-162800 | 6/1997 |
| WO | WO 98/25360 | 6/1998 |

OTHER PUBLICATIONS

RCE, STD-27, pp. 49-51.
Translation of Japanese Patent Application No. 05-218883.

* cited by examiner

*Primary Examiner*—Melody Mehrpour
(74) *Attorney, Agent, or Firm*—Pearl Cohen Zedek Latzer, LLP

(57) ABSTRACT

A portion of a traffic channel message is detected and decoded to determine if a rapid handover procedure may be used. A first portion of the traffic channel includes information data and CRC data. The CRC data is decoded, and if the CRC determines the message is valid, the mobile station may proceed directly to handover.

21 Claims, 3 Drawing Sheets

RAPID DECODING OF CONTROL CHANNEL TO DECREASE HANDOFF TIME

CROSS-REFERENCE TO RELATED APPLICATIONS

This application is a continuation application of and claims priority to U.S. patent application Ser. No. 09/753,085, filed Dec. 28, 2000 now U.S. Pat. No. 6,792,272.

TECHNICAL FIELD

This invention relates to wireless communication systems, and more particularly to decreasing handoff time between traffic channels.

BACKGROUND

The use of wireless communication systems is growing with users now numbering well into the millions. One of the popular wireless communications systems is the cellular telephone, having a mobile station (or handset) and a base station. Cellular telephones allow a user to talk over the telephone without having to remain in a fixed location. This allows users to, for example, move freely about the community while talking on the phone.

In a radiotelephone communication system, a communication link via an RF channel is established between a mobile station, or subscriber unit, and a source base station. As a mobile station moves out of range of the source base station, the signal quality will degrade until the communication link would ultimately be broken, or the call "dropped". To avoid loss of the communication link resulting from a dropped call, the communication link is shifted from the source base station to a target base station. This process of making the shift is commonly referred to in the radiotelephone communication area, or cellular communication area as a handover process.

A handover can be defined as a change of channel during a call, either because of degradation of the quality of the RF channel which includes, power level or communication link quality below a certain threshold, or because of the availability of another channel which can allow communication at a lower transmit power, or to prevent a mobile station from grossly exceeding the planned base station boundaries. A handover may occur during a call in progress (e.g. from a traffic channel to a traffic channel), or during the initial signaling during call set-up. The handover may be either from a channel on the source base site to another channel on a target base site or between channels on the source base site.

DESCRIPTION OF DRAWINGS

Features and advantages of the invention will become more apparent upon reading the following detailed description and upon reference to the accompanying drawings.

DETAILED DESCRIPTION

Figure 1:
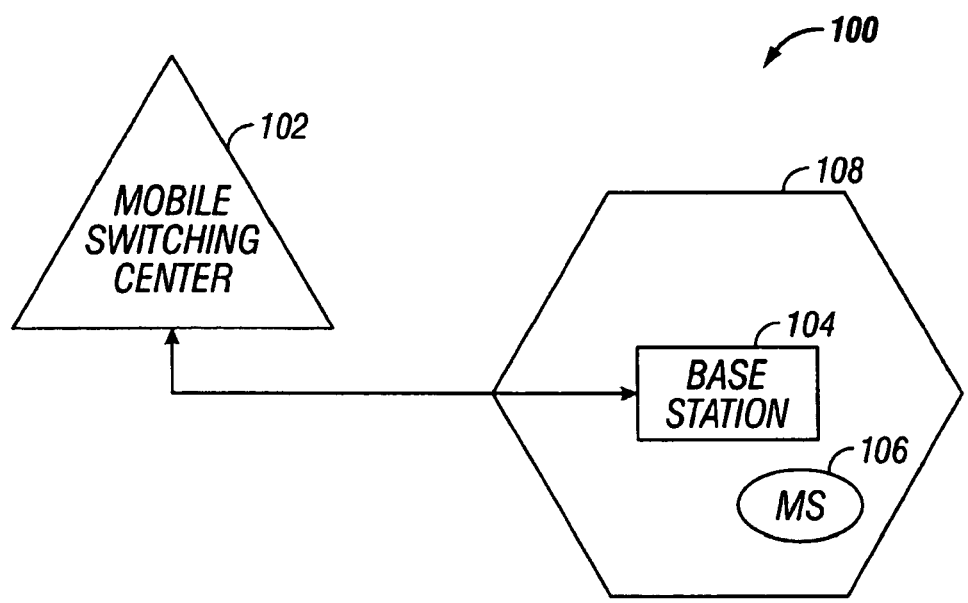
FIG. 1 illustrates components of a wireless communication system appropriate for use with an embodiment of the invention.

FIG. 1 illustrates components of a wireless communication system. A mobile switching center 102 communicates with a base station 104. The base station 104 broadcasts data to and receives data from mobile stations 106 within a cell 108. The cell 108 is a geographic region, roughly hexagonal, having a radius of up to 35 kilometers or possibly more.

The mobile station 106 is capable of receiving data from and transmitting data to a base station 104. Additional cells adjacent to the cell 108 permit mobile stations 106 to cross cell boundaries without interrupting communications. This is because base stations 104 in adjacent cells assume the task of transmitting and receiving data for the mobile stations 106. The mobile switching center 102 coordinates all communication to and from mobile stations 106 in a multi-cell region, thus the mobile switching center 102 may communicate with many base stations 104.

The mobile stations 106 may move about freely within the cell 108 while communicating either voice or data. The mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone synchronizes communication with the base station 104. The cellular telephone then registers with the mobile switching center 102 to make itself known as an active user within the wireless network.

The mobile station 106 scans data frames broadcast by the base station 104 to detect any telephone calls or paging messages directed to the cellular telephone. In this call detection mode, the mobile station 106 receives, stores and examines paging message data, and determines whether the data contains an identifier matching an identifier of the mobile station 106. If a match is detected, the mobile station 106 establishes a call with the mobile switching center 102 via the base station 104. If no match is detected, the mobile station 106 enters an idle state for a predetermined period of time, then exits the idle state to receive another transmission of paging message data.

Figure 2:
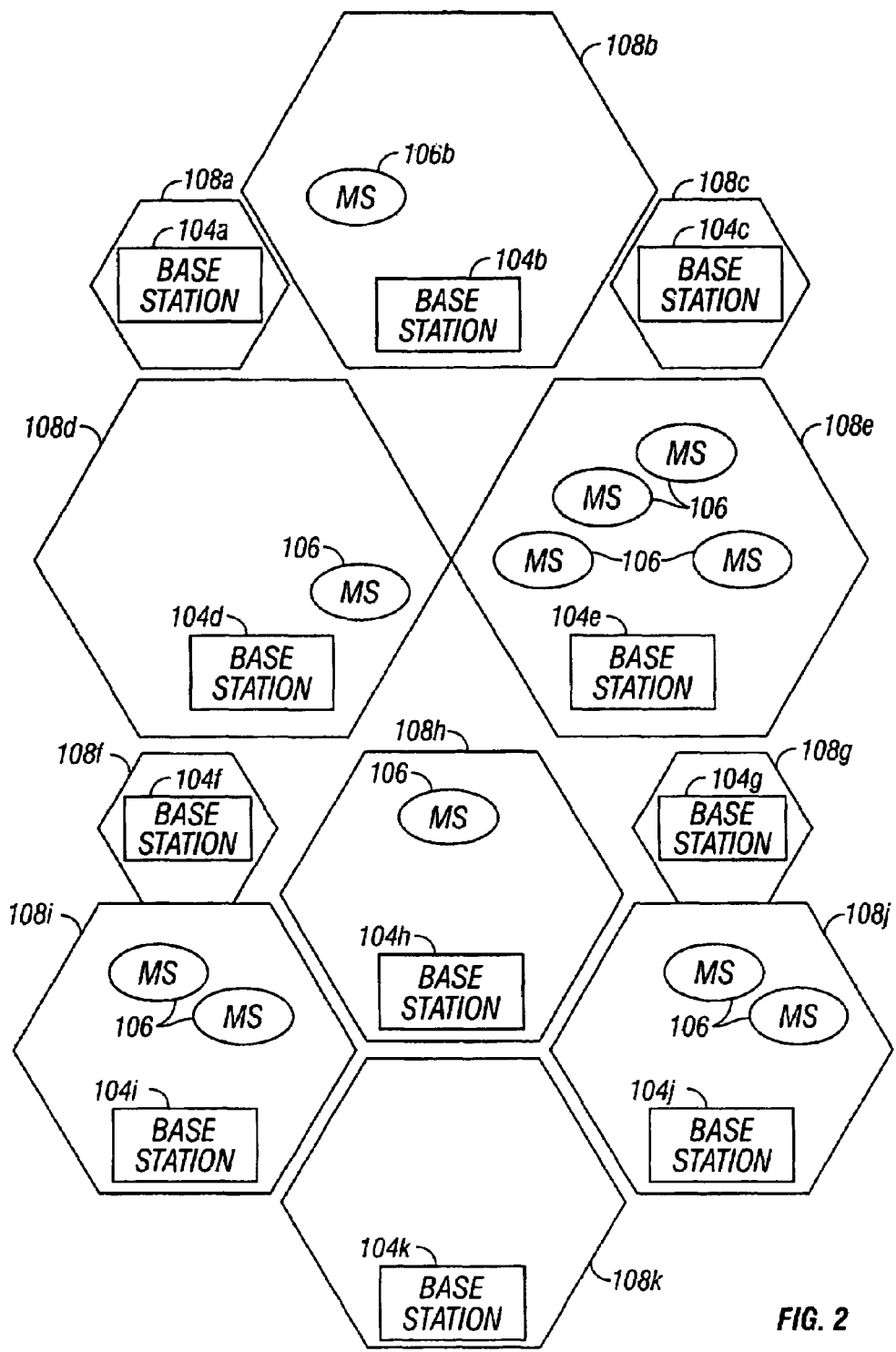
FIG. 2 illustrates a series of cells in a wireless communication system.

FIG. 2 illustrates one example of a series of cells 108a-108k in a wireless communication system. The cells 108a-108k are generally hexagonal, although they may be other shapes including circular, square, oval, oblong, or any other polygon. The size of each cell 108a-108k may vary depending on location. For example, in densely packed urban areas, a cell 108f may be small but in a more rural area the size of a cell 108b increases. Each of the cells 108a-108k has a corresponding base station 104a-104k.

In FIG. 2, the mobile station 106b is located in the cell 108b. While the mobile station 106b is in cell 108b, it is likely being served by the base station 104b, although due to loading and other requirements, it may be served by any base station 104 providing a useable signal. While in one cell 108, the mobile station 106 periodically checks the signal strength of the base stations 104 in each neighboring cell 108. For example, while the mobile station 106b is in the cell 108b, the mobile station 106b monitors the signal strength of base stations 104a, 104c, 104d, and 104e. If the mobile station 106b travels into cell 108e, the mobile switching center 102 may cause the mobile station 106b to handover to base station 104e. In this circumstance, the mobile station 106 then periodically monitors the signal strength of base stations 104b, 104c, 104d, 104g, and 104h. To travel between the cells 108a-108k, the mobile stations 106 may detect a traffic channel message from neighboring base stations 104. Once the traffic channel message is confirmed, the mobile station 106 may initiate a handover procedure to switch base stations 104.

Figure 3:
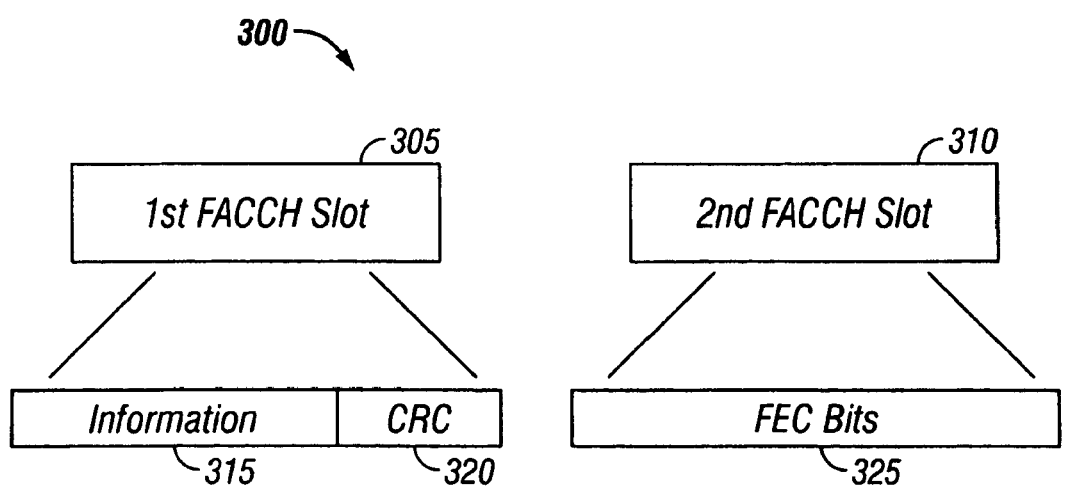
FIG. 3 illustrates a traffic channel message assembly process according to one embodiment of the present invention.

FIG. 3 illustrates a traffic channel message assembly process 300 according to one embodiment. In a Personal Digital Communication (PDC) system, the traffic channel includes a Fast Associated Control Channel (FACCH). The handover time can be decreased by decreasing the decoding time of the FACCH. Handover time is the period from when the mobile station 106 switches from the current traffic channel until synchronization is established with the newly assigned traffic channel. Thus, if the new traffic channel can be decoded quickly, the mobile station 106 can decrease the time require until synchronization, and therefore decrease handoff time.

In the PDC system, the FACCH contains a number of slots 305, 310. Each of these slots 305, 310 includes information that make up the entire FACCH. In the FACCH, each slot 305, 310 has 112 bits of data. The first slot 305 includes information bits 315 and Cyclic Redundancy Check (CRC) bits 320. The second slot 310 includes Forward Error Control (FEC) bits 325. Forward error control (FEC) bits provide the ability to detect and correct digital messages even in the presence of transmission errors. However, if the CRC bits indicate the message was received without error, the FEC bits may be redundant. If the CRC bits do not indicate the message was received without error, the FEC bits may be used to further check the status of the message. Currently, both the CRC bits and the FEC bits and received, extracted, and stored prior to processing any message from the traffic channel.

Figure 4:
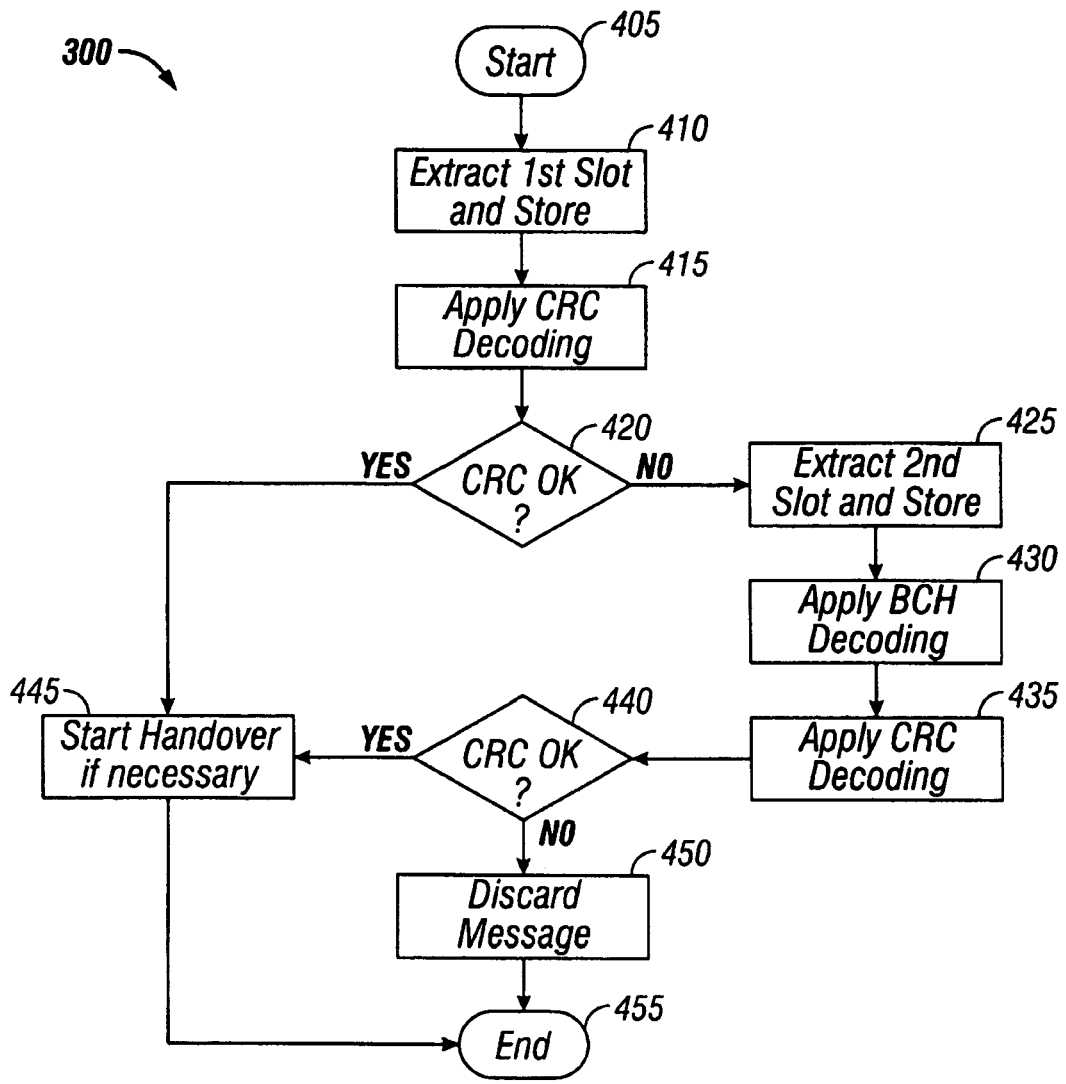
FIG. 4 illustrates a procedure to decode the traffic channel message according to-one embodiment of the is present invention.

FIG. 4 illustrates a process 400 to decode the traffic channel message according to one embodiment of the present invention. The process 400 begins at a start block 405. Proceeding to block 410, the first slot 305 of the traffic channel message is extracted and stored in bytes. Proceeding to block 415, CRC decoding is applied to the CRC bits 320 in the first slot 320.

Proceeding to block 420, the results of the CRC decoding of block 415 are examined. If the data in the first slot 305 was successfully received, the CRC bits 320 would be intact and the CRC decoding would indicate the decoding was successful. If the CRC decoding is successful, the process 400 proceeds along the YES branch to block 445. In good channel conditions when the bit error rate (BER) is low, the error probability is low. Thus, the chances the CRC decoding will be successful is increased. If the CRC decoding is unsuccessful, the process proceeds along the NO branch to block 425.

In block 425, the second slot 310 of the traffic channel message including the FEC bits 325 is extracted and stored in bytes. Proceeding to block 430, the traffic channel message may be decoded using Bose-Chaudhuri-Hocquengh (BCH) coding. BCH codes are cyclic block codes that are rooted in linear algebra and the properties of those equations. The design of BCH codes may be selected by defining desired coding parameters that may be related directly to overhead and performance. The BCH codes are powerful linear codes for a significant range of block lengths.

Proceeding to block 435, after the traffic channel message is decoded, the CRC decoding is performed a second time. The process 400 then proceeds to block 440 to check the results of the CRC decoding. If the decoding indicates that the traffic channel was received successfully, the process proceeds along the YES branch to block 445. In block 445, the handover process to the new traffic channel may be initiated. The handover process may be directed by the wireless communication network.

Returning to block 440, if the CRC decoding indicates the traffic channel was not successfully received, the process 400 proceeds along the NO branch to state 450. In state 450, the traffic channel message is discarded as unreliable. Following both block 445 and 450, the process terminates in end block 455.

The principles of the present invention which apply to a cellular-based digital communication system also apply to other types of communication systems, including but not limited to personal communication systems, trunked systems, satellite systems and data networks. Likewise, the principles of the present invention which apply to all types of digital radio frequency channels also apply to other types of communication channels, such as electronic data buses, wireline channels, optical fiber links and satellite links.

Numerous variations and modifications of the invention will become readily apparent to those skilled in the art. Accordingly, the invention may be embodied in other specific forms without departing from its spirit or essential characteristics.

What is claimed is:

1. A method of decreasing handover time in a wireless communication system comprising:
   receiving a first portion of a traffic channel comprising cyclic redundancy check (CRC) bits;
   checking the validity of the first portion of the traffic channel; and
   if the first portion of the traffic channel is valid, initiating handover; and
   if the first portion of the traffic channel is invalid:
      receiving a second portion of the traffic channel comprising error control bits;
      decoding the traffic channel; and
      checking the validity of the control bits.

2. The method of claim 1, wherein the error control bits comprise forward error control (FEC) bits.

3. The method of claim 1, further comprising discarding the traffic channel if the error control bits are invalid.

4. The method of claim 1, further comprising decoding the traffic channel using BCH decoding.

5. A method of initiating handover comprising:
   extracting a first slot of a traffic channel;
   checking the validity of the first slot of the traffic channel by applying cyclic redundancy check (CRC) decoding to the first slot of the traffic channel;
   determining the validity of the first slot of the traffic channel based on the CRC decoding and;
   if the first slot of the traffic channel is valid, initiating any requested handover and;
   if the first portion of the traffic channel is invalid:
      extracting a second slot of the traffic channel containing error control bits;
      decoding the traffic channel; and
      checking the validity the error control bits.

6. The method of claim 5, further comprising storing the first slot of the traffic channel in bytes.

7. The method of claim 5, further comprising determining if handover is requested.

8. The method of claim 5, wherein the error control bits comprise forward error control (FEC) bits.

9. The method of claim 8, further comprising discarding the traffic channel if determined invalid.

10. The method of claim 9, further comprising applying BCH decoding to the traffic channel.

11. A mobile station for use in a wireless communication system comprising:

a receiver which receives a first slot of a traffic channel; and a decoder which decodes the first slot of the traffic channel to determine the validity of the first slot of the traffic channel by decoding cyclic redundancy check (CRC) bits, wherein if the first slot is determined valid, the mobile station initiates handover, and if the first portion of the traffic channel is invalid:

the decoder decodes a second slot of the traffic channel containing at least error control bits to determine the validity of the error control bits.

12. The mobile station of claim 11, wherein the error control bits comprise forward error control (FEC) bits.

13. An apparatus, including instructions residing on a machine-readable storage medium, for use in a machine system to handle a plurality of instructions, the instructions causing the machine to:

extract a first slot of a traffic channel;

apply cyclic redundancy check (CRC) decoding to the first slot of the traffic channel;

determine the validity of the first slot of the traffic channel based on the CRC decoding;

initiate any requested handover if the first slot is valid and;

if the first slot is invalid:

extract a second slot of the traffic channel containing error control bits; and determine the validity of the traffic channel by decoding the error control bits.

14. The apparatus of claim 13, wherein the first slot of the traffic channel is stored in bytes.

15. The apparatus of claim 13. wherein the instructions further cause the machine to determine if handover is requested.

16. A communication system comprising:

one or more antenna(e) through which the communication system may establish a wireless communication channel with one or more remote communications system(s);

a receiver, responsive to at least a subset of the one or more antennae, to receive a first communication channel having a first portion and a second portion; and a decoder to decode only content of the first portion of the communication channel to determine whether the channel was received without significant error to determine whether to initiate a handover, wherein if the first portion is determined invalid by the decoder the receiver receives the second portion of the first communication channel and the decoder decodes the second portion of the first communication channel to determine the validity of the error control bits.

17. A system according to claim 16, the receiver to compute a CRC of the first portion to determine whether significant error has been incurred in the communication channel in transmission from the remote system.

18. A system according to claim 17, the receiver to initiate handover upon a positive CRC check of the first portion of the communication channel and before any decoding of the second portion of the communication channel.

19. A method of initiating handover in a wireless communication system, the method comprising:

receiving a wireless communication channel having at least a first portion and a second portion;

initiating handover only upon a positive decoding of the first portion without regard to the content of the second portion and without first decoding the second portion; and performing a cyclical redundancy check (CRC) of the content of the second portion upon a negative decoding of the first portion, wherein the positive decoding of the second portion comprises performing the CRC without identifying significant error in the first portion.

20. A method according to claim 19, wherein the error control bits comprise forward error control (FEC) bits.

21. A method according to claim 19 wherein the communication channel is a fast associated control channel (FACCH).

* * * * *